US008225998B2

(12) United States Patent
Bolton

(10) Patent No.: US 8,225,998 B2
(45) Date of Patent: Jul. 24, 2012

(54) SECURE BALLOT BOX

(75) Inventor: Steve Bolton, Clearwater, FL (US)

(73) Assignee: ES&S Innovations LLC, Omaha, NE (US)

( * ) Notice: Subject to any disclaimer, the term of this patent is extended or adjusted under 35 U.S.C. 154(b) by 349 days.

(21) Appl. No.: 12/171,726

(22) Filed: Jul. 11, 2008

(65) Prior Publication Data

US 2010/0006649 A1 Jan. 14, 2010

(51) Int. Cl.
*G06K 17/00* (2006.01)
(52) U.S. Cl. ............................ 235/386; 235/51; 705/12
(58) Field of Classification Search .................... 235/51, 235/386; 705/12
See application file for complete search history.

(56) References Cited

U.S. PATENT DOCUMENTS

| | | | | |
|---|---|---|---|---|
| 4,981,259 | A * | 1/1991 | Ahmann | 232/2 |
| 6,264,488 | B1 * | 7/2001 | Helot et al. | 439/341 |
| 6,283,304 | B1 * | 9/2001 | Gottlieb et al. | 209/603 |
| 7,392,993 | B1 * | 7/2008 | Prohl et al. | 280/33.998 |
| 2001/0050306 | A1 * | 12/2001 | Plumb | 232/2 |
| 2002/0092908 | A1 * | 7/2002 | Chumbley | 235/386 |
| 2004/0016802 | A1 * | 1/2004 | Cummings | 235/386 |
| 2004/0050920 | A1 * | 3/2004 | Vogel | 232/2 |
| 2005/0061880 | A1 * | 3/2005 | Vanek et al. | 235/386 |
| 2005/0247783 | A1 | 11/2005 | Poulos | |
| 2007/0241190 | A1 | 10/2007 | Hotto | |
| 2008/0011845 | A1 | 1/2008 | Guo | |
| 2008/0308633 | A1 | 12/2008 | Bolton et al. | |
| 2008/0308634 | A1 | 12/2008 | Bolton et al. | |

FOREIGN PATENT DOCUMENTS

WO WO2008/113058 A1 9/2008

OTHER PUBLICATIONS

Election Systems and Software, brochure, *Model 100 Precinct Ballot Counter*, Mar. 22, 2005, 1 pg.
Election Systems and Software, brochure, *intElect DS200, The Next Generation of Paper-Based Vote Tabulation*, 2 pgs (This brochure describes a product in use prior to the filing date of this application.).
Product Fact Sheet for Unisyn Voting Solutions InkaVote and InkaVote Plus, published Oct. 29, 2006, two pages.
Product Fact Sheet for Sequioa Voting Systems Optech III-P Eagle, published Oct. 29, 2006, two pages.
Brochure from Los Angeles County Registrar-Recorder/County Clerk Office, *InkaVote Plus is here*, published Jan. 18, 2008, two pages.

(Continued)

*Primary Examiner* — Ali Sharifzada
(74) *Attorney, Agent, or Firm* — Stinson Morrison Hecker LLP

(57) ABSTRACT

A secure ballot box includes a main compartment for receiving ballots, a case including a base and a cover supported by the main compartment, and a scanner supported within the base. The cover is coupled with the base and is moveable between a closed position enclosing the scanner and an open position exposing at least a portion of the scanner. The case and scanner are removable from the main compartment for easy transport. A sensor, operable to detect the height of the ballots collected within the main compartment, is coupled with the scanner to switch the scanner to an off mode such that additional ballots will not be accepted when the height of ballots within the main compartment reaches a predetermined threshold level.

21 Claims, 12 Drawing Sheets

OTHER PUBLICATIONS

Screen shots from Indra Systems, S.A. website regarding Papervote Plus, published Nov. 2000, four pages.

Product Fact Sheet for Diebold Incoporated AccuVote-OS, published 2003, two pages.

Product Fact Sheet for Hart Intercivic's eScan, published 2006, two pages.

Santa Cruz County, Optech Insight Poll Worker's Manual, published Nov. 2006, 40 pages.

ES&S Model 100 Precinct Ballot Counter Operator's Manual, Version 5, published May 22, 2003. 28 pages.

"The Insight Plus", brochure, Sequoia Voting Systems, 3 pgs.

* cited by examiner

SECURE BALLOT BOX

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to a ballot box, and more particularly to a ballot box having a main, lower compartment, with an upper case that is removable from the lower compartment, the ballot box being adapted to enclose a scanner.

2. Description of Related Art

A ballot box is a storage unit that is configured to receive and safely store election ballots at polling sites before those ballots are transferred to a central location for processing and/or storage. A scanner is often used in conjunction with the ballot box to optically scan the results of each ballot before the ballot is deposited into a storage container within the ballot box. One type of ballot box comprises a container that supports a scanner sitting atop a storage container, with an opening in the container aligned with the scanner such that as ballots are processed through the scanner (with the scanner optically scanning and storing the results for each ballot), the ballots fall into the container. However, in these known configurations, there is no protection provided to the scanner itself, as it sits exposed atop the ballot box. Furthermore, there is no provision to prevent jamming of the scanner or to prevent the scanner from accepting ballots when the ballot box becomes filled with ballots, and no provision to accept ballots for storage when the scanner is inoperable.

BRIEF SUMMARY OF THE INVENTION

A ballot box according to an exemplary embodiment of the present invention comprises a main compartment for receiving ballots, a case with a base supported by the main compartment, and a scanner supported by the base. A cover is coupled with the base and is moveable between a closed position enclosing the scanner and an open position exposing at least a portion of the scanner. The case and scanner are removable from the bin for transporting the scanner to a safe storage location after each election. The case encloses the scanner for protection during transport.

In another embodiment, a ballot box comprises a main compartment for collecting ballots, a scanner positioned on the main compartment, and a sensor operable to detect the height of the ballots received within the main compartment. The scanner is operable to switch between an on mode in which the scanner accepts and scans ballots, transporting the ballots into the main compartment, and an off mode in which the scanner does not accept and scan ballots. Upon detecting that the height of ballots in the main compartment exceeds a predetermined threshold level, the sensor sends a signal to the scanner to switch the scanner from the on mode to the off mode so that the scanner will no longer accept ballots, thus preventing the scanner and/or main compartment from becoming jammed. An emergency ballot bin is included to accept ballots that are not accepted by the scanner.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

Figure 1:
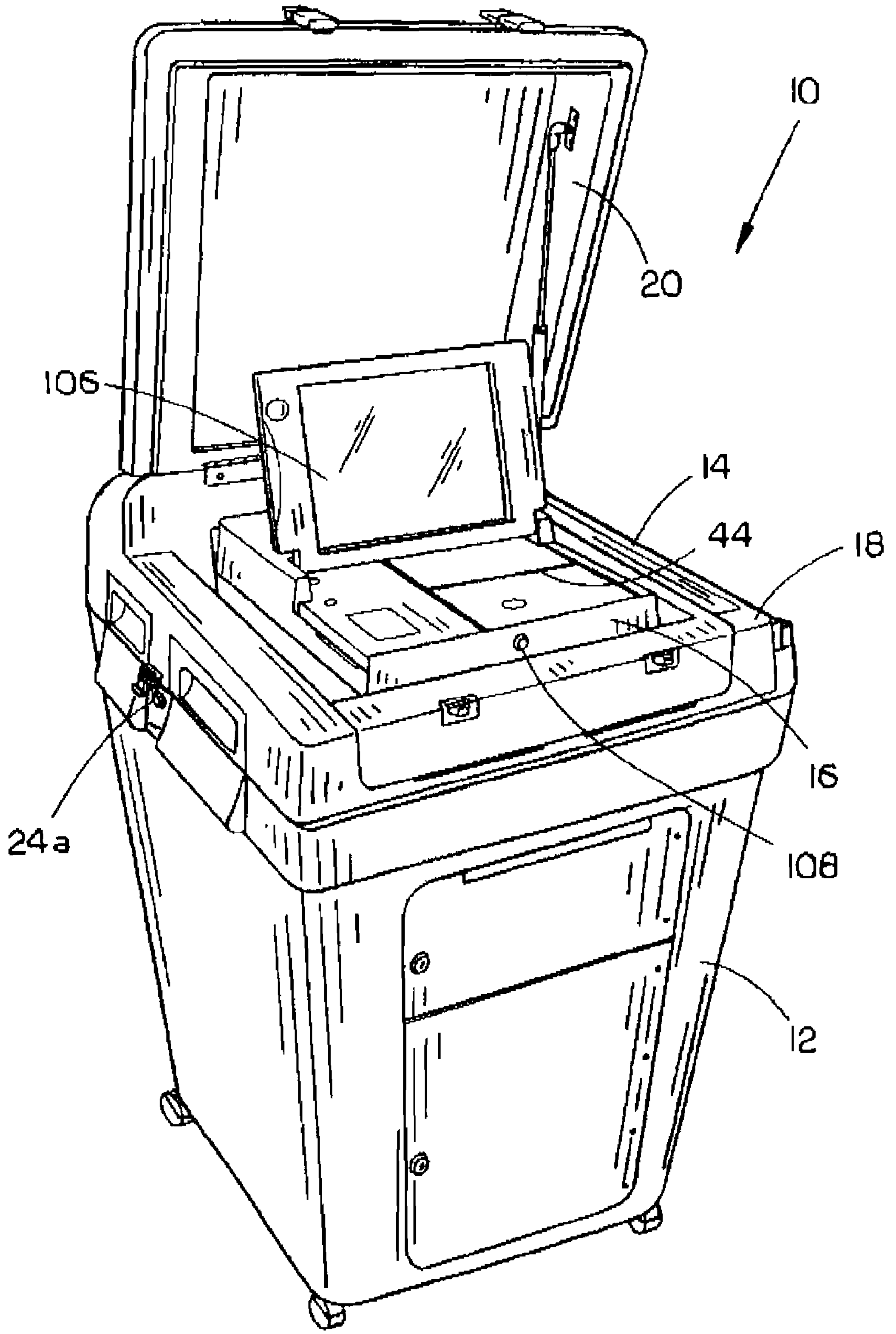
FIG. 1 is a perspective view of a ballot box according to a first exemplary embodiment of the present invention.
Figure 6:
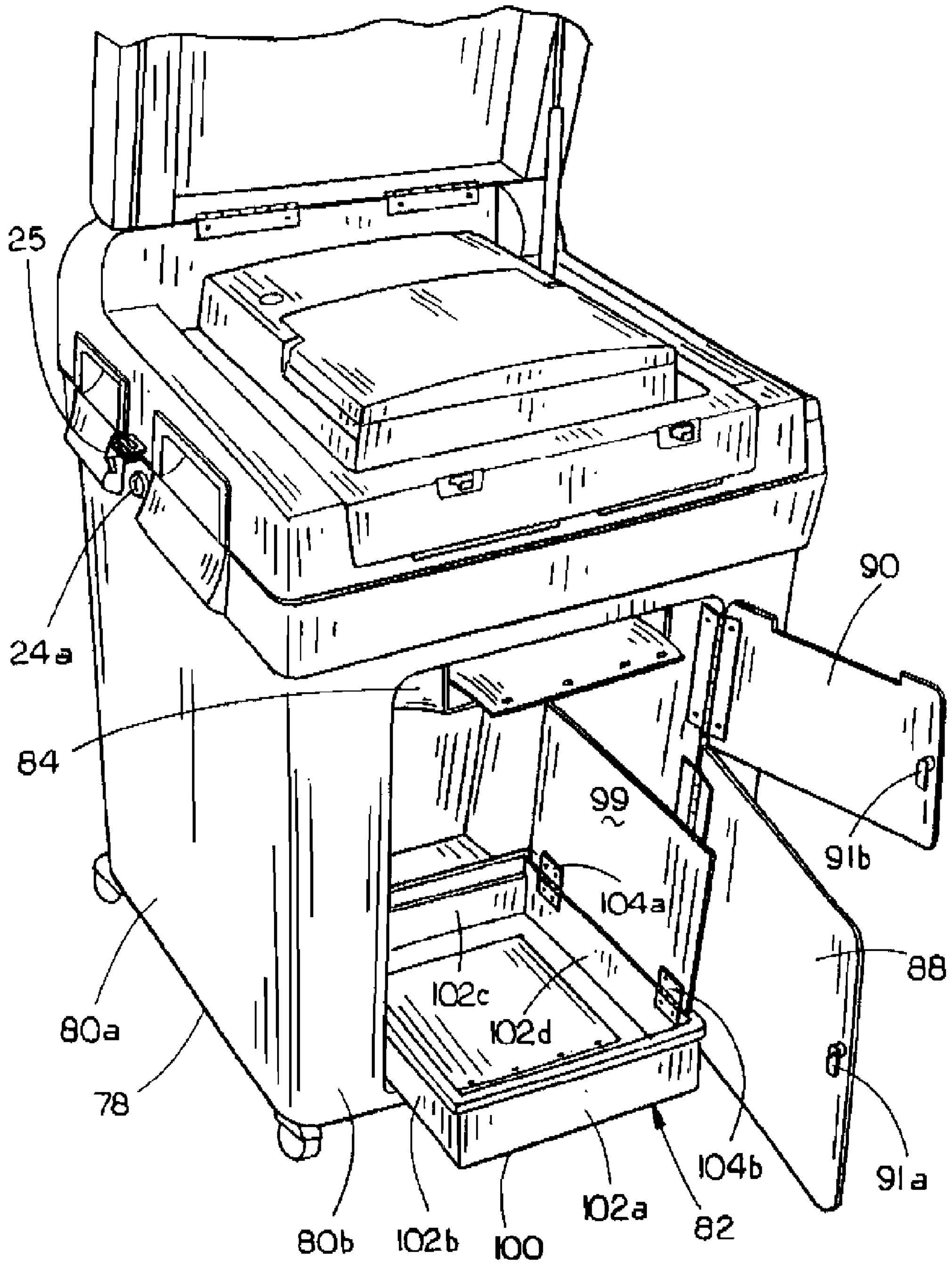
FIG. 6 is a perspective view of the ballot box of FIG. 1 showing a bin with first and second doors in an open position.

A ballot box in accordance with a first exemplary embodiment of the present invention is depicted in FIG. 1, indicated generally by numeral 10. Ballot box 10 includes a main compartment 12 for receiving ballots, a removable case 14 positioned on, and supported by, the main compartment 12, with a scanner 16 positioned on and supported by case 14 for scanning completed ballots. As seen in FIG. 6, main compartment 12 houses a main ballot bin 82 used to collect and secure ballots after they are scanned by scanner 16, and an emergency ballot bin 84 used to collect and secure ballots that cannot be scanned by scanner 16, each of which bins will be described in more detail hereinbelow.

Case

Figure 2:
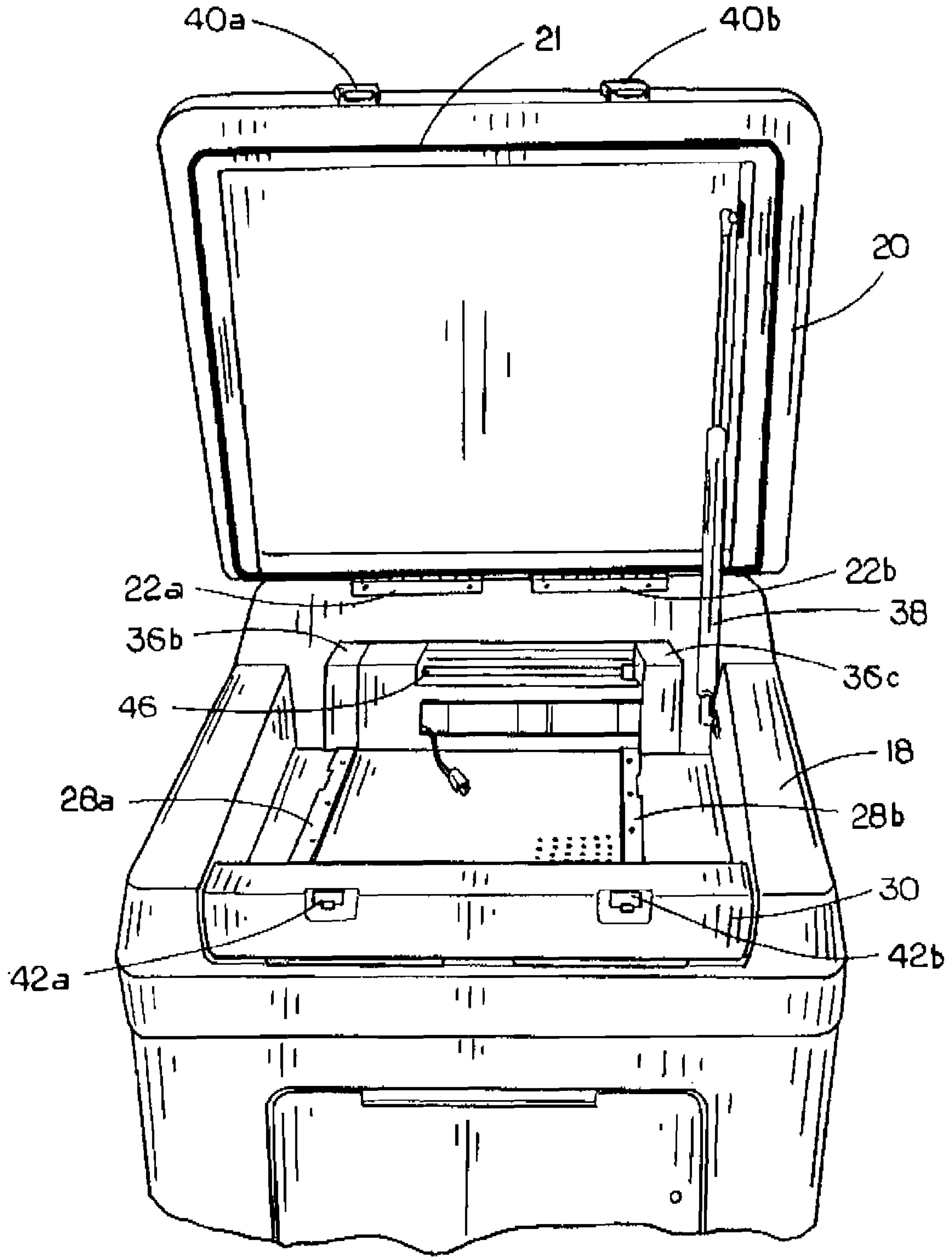
FIG. 2 is a perspective view of a portion of the ballot box of FIG. 1 showing a case with a cover in an open position.
Figure 5:
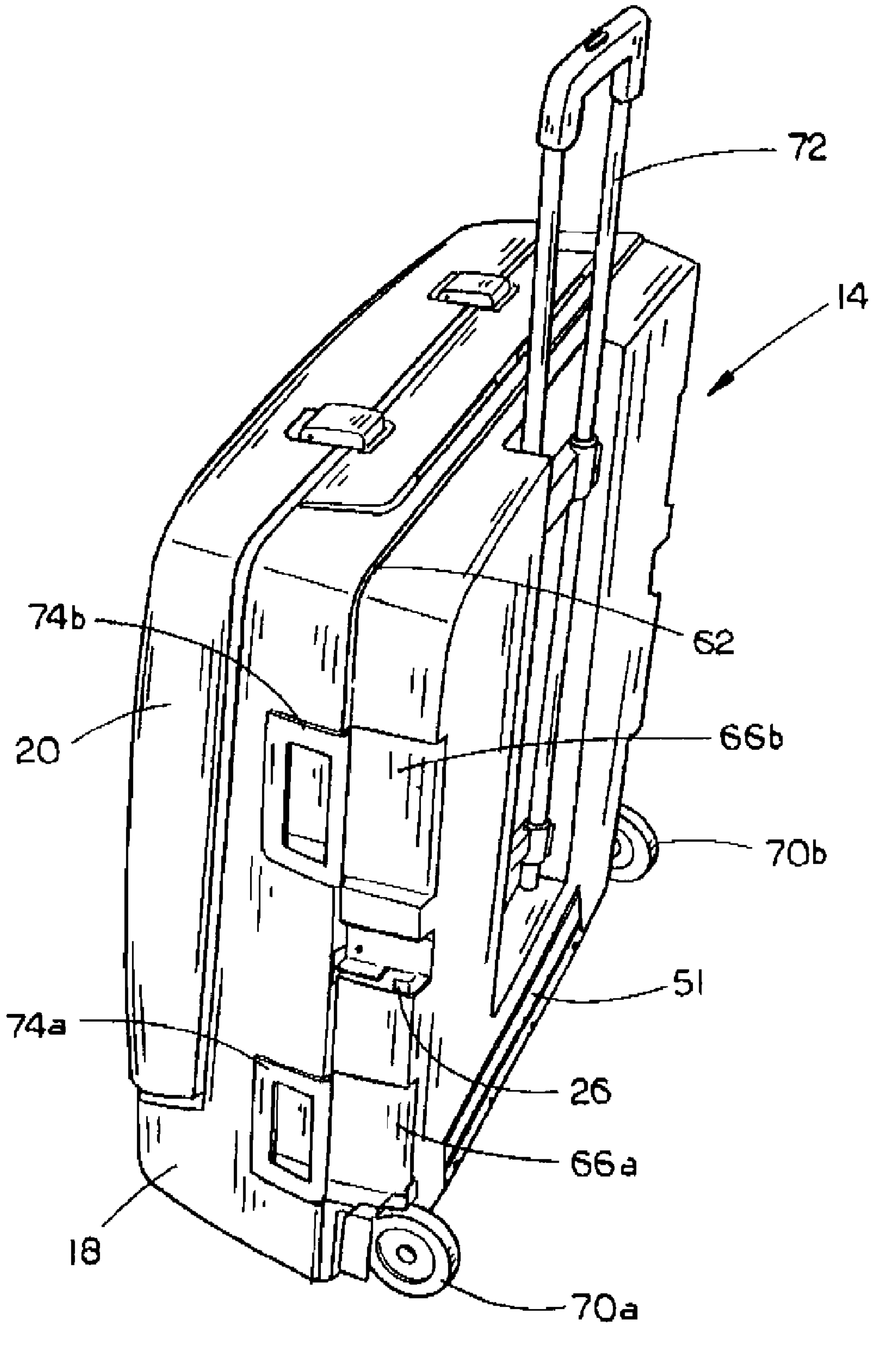
FIG. 5 is a perspective view of the case of the ballot box of FIG. 1.

Case 14 comprises a base 18 and a cover 20, with cover 20 movably attached to base 18 via hinges 22*a* and 22*b*, as shown in FIG. 2. Cover 20 is thus movable between an open position, as shown in FIG. 1, and a closed position, as shown in FIG. 5.

Figure 8:
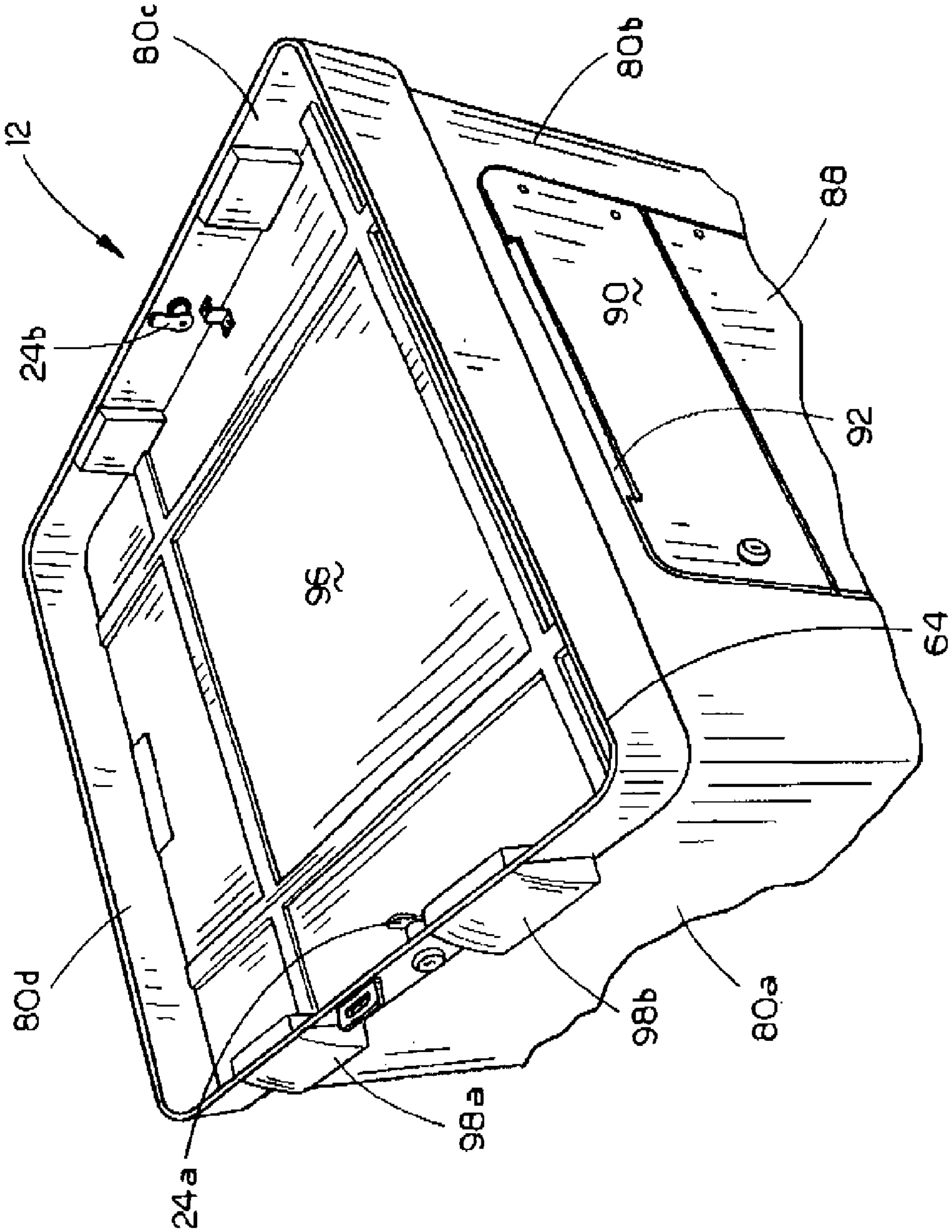
FIG. 8 is a perspective view of a portion of the ballot box of FIG. 1 showing a top enclosing the bin.

With cover 20 in the open position, scanner 16 is exposed and accessible such that the scanner can receive ballots for scanning. With cover 20 in the closed position, scanner 16 is not accessible for scanning ballots, but is completely enclosed for protection during transport and storage. As depicted in FIGS. 5 and 8, case 14 is removable from compartment 12 so that the entire case (and enclosed scanner) may be easily transported between a storage location and a polling site.

Locks 24*a* and 24*b*, best seem in FIG. 8, are operable to secure base 18 to main compartment 12. Each lock 24*a*, 24*b* includes a lever that pivots in conjunction with a key inserted and turned in the lock, so that the lever rotates between an unlocked and a locked position. In the locked position, the lever of lock 24*a* is received by slot 26 in the case, as best seen in FIG. 5. In a similar fashion, the lever of lock 26*b* is received by a slot oil the opposite side of the base. With the levers of the locks engaged in the corresponding slots, the base 18 is secured to main compartment 12. While locks 24*a* and 24*b* are shown as levers received by slots on the base, it is within the scope of the invention for any type of locking mechanism to be used for securing the base to compartment 12, or for there to be no locking mechanism at all.

Looking to FIG. 2, base 18 includes a recessed area for receiving the scanner, with attachment rails 28*a* and 28*b* secured to the bottom of the recessed area, extending from the front to the back, positioned generally parallel to the sides of the ballot box. A portion of each of rails 28*a*, 28*b* extends slightly above the surface of the bottom of the recessed area, thus configured to receive and mate with corresponding mating rails affixed to the bottom of scanner 16. The corresponding mating rails on scanner 16 likewise include a portion extending outwardly from the bottom of the scanner, configured to slidably mate with rails 28*a*, 28*b*, so that scanner 16 can be slid into the recessed area with the rails on the bottom of the scanner engaging rails 28*a*, 28*b*. With the corresponding mating rails thus engaged, scanner 16 is secured to base 18 such that the scanner cannot be moved vertically relative to the base.

Figure 3:
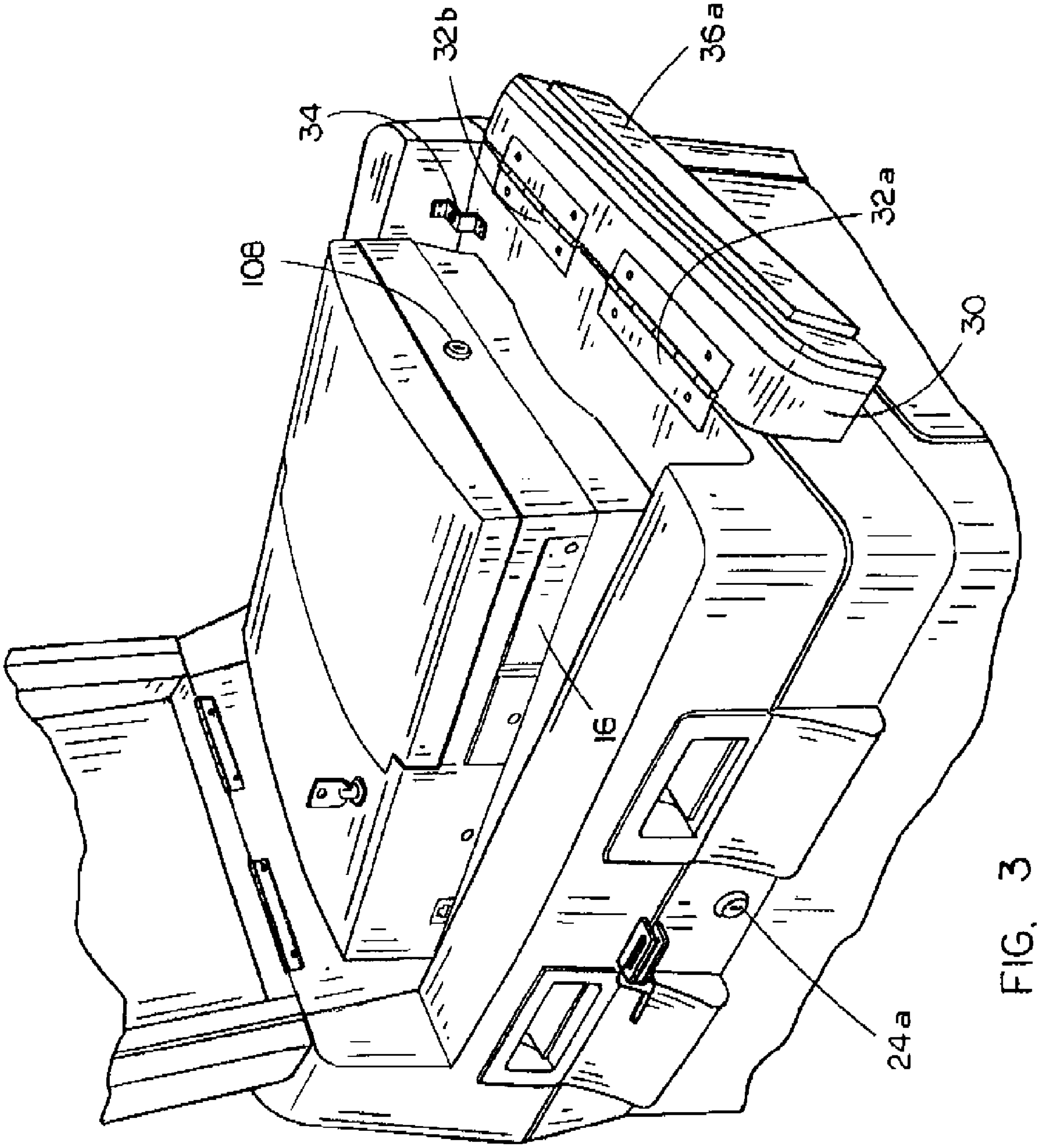
FIG. 3 is a perspective view of a portion of the ballot box of FIG. 1 showing a retaining door on the case in an open position.

As best seen in FIG. 3, a retaining door 30 is joined to base 18 by hinges 32*a* and 32*b*. Retaining door 30 is moveable between an open position as shown in FIG. 3 and a closed position shown in FIG. 2. With retaining door 30 in the open position, the rails on the bottom of the scanner may be engaged with rails 28*a*, 28*b* to secure the scanner from vertical movement as described above. With retaining door 30 then placed into the closed position, scanner 16 is also prohibited from horizontal movement, and the scanner is thus secured into base 18, prevented from movement in any direction. Lock 34, shown in FIG. 3, is operable to secure retaining door 30 in the closed position via a pin extending from the lock into a receptacle on the retaining door. Of course, other locking or latching mechanisms may be used to secure the retaining door. A foam pad 36*a* is affixed to the inner surface of the retaining door to prevent damage to the scanner when the retaining door is in the closed position, and further acts as a cushion against any movement of the scanner within the recessed area. Similarly, as seen in FIG. 2, foam pads 36*b* and 36*c* are mounted on the inner surfaces of the recessed area in base 18 to protect the scanner from movement and subsequent damage.

Referring still to FIG. 2, a damper cylinder 38 is attached between base 18 and cover 20 to support the cover in the open position. Damper cylinder 38 may be any type of pneumatic and/or hydraulic cylinder as known in the art. Latches 40*a* and 40*b* are mounted on cover 20 for engagement with corresponding catches 42*a* and 42*b* mounted on retaining door 30. Latches 40*a* and 40*b* are preferably operable to lock into engagement with catches 42*a* and 42*b* for securing cover 20 in the closed position. Although latches and catches are shown securing the cover and base, it is within the scope of the invention to use any type of closing mechanism to secure the cover and base. A resilient seal 21 extends around the perimeter of cover 20, set back from the edge approximately one inch. Seal 21 provides an environmental seal to cover 20 such that the interior of base 18 (and the enclosed scanner) is protected from moisture, rain, sand, dust, and any other environmental contaminants when cover 20 is closed and seal 21 is compressed between cover 20 and base 18.

Figure 11:
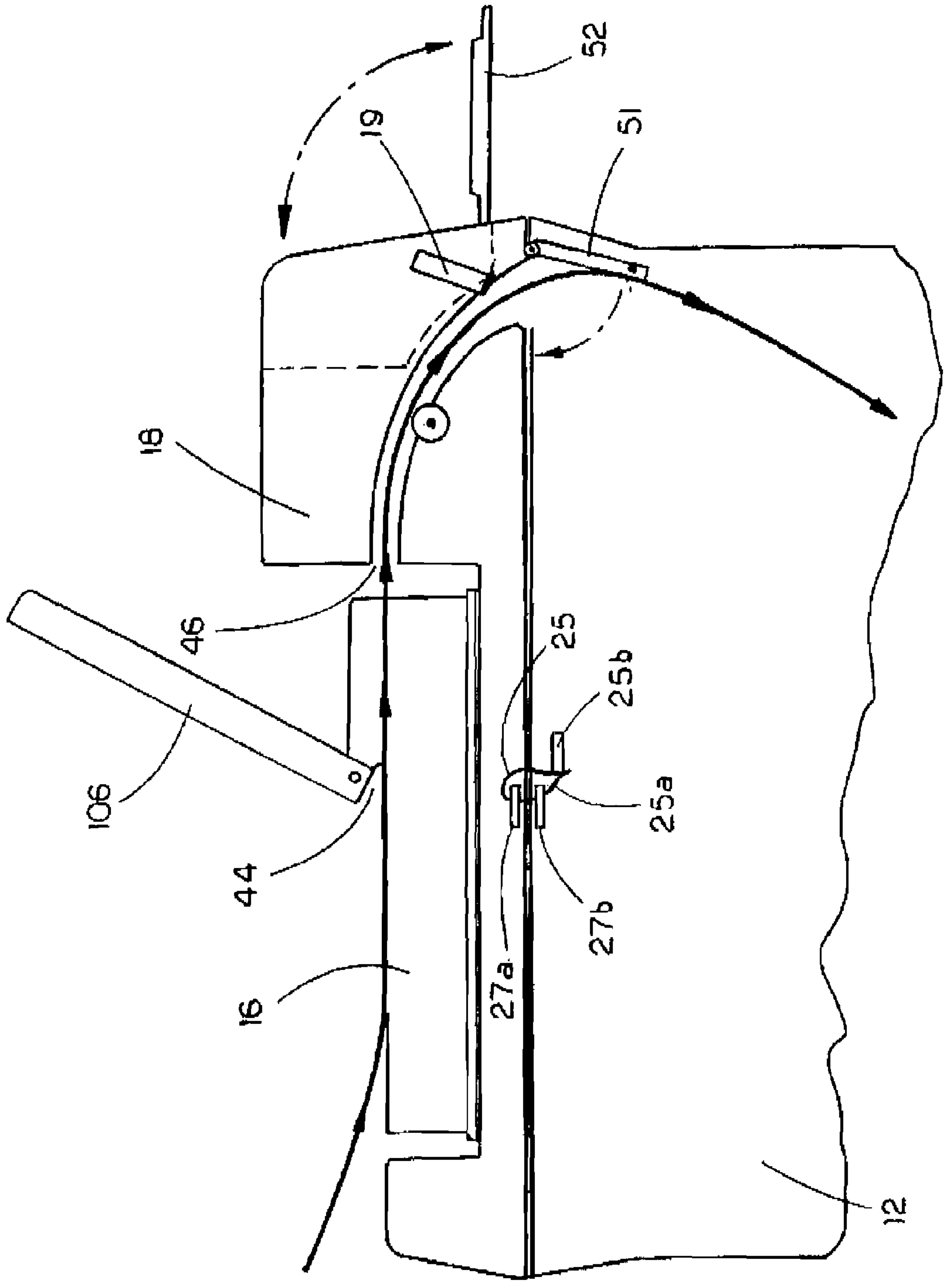
FIG. 11 is a cut-way side view of the upper portion of the ballot box of FIG. 1.

Referring now to FIG. 11 scanner 16 comprises a ballot path for routing a scanned ballot through the scanner, the ballot path having an entrance 44 located at the upper rear portion of the scanner for receiving a ballot, with the ballot exiting the rear or the scanner. Ballots scanned by the scanner are thus passed into entrance 44 and out of the exit at the rear of the scanner. Looking still to the cut-away view in FIG. 11, base 18 similarly includes a ballot path comprising an entrance 46 located at the rear of the recessed portion of the base, with an exit out of the bottom of the case and into main compartment 12. With the scanner secured in place on base 18 as described above, the exit of the ballot path of the scanner 16 is aligned with the entrance of the ballot path of the base 18 such that ballots pass sequentially through the ballot path of the scanner to the ballot path of the base and into main compartment 12. Thus, a scanned ballot travels through the ballot paths in scanner 16 and base 18 before being deposited into main compartment 12.

Figure 4:
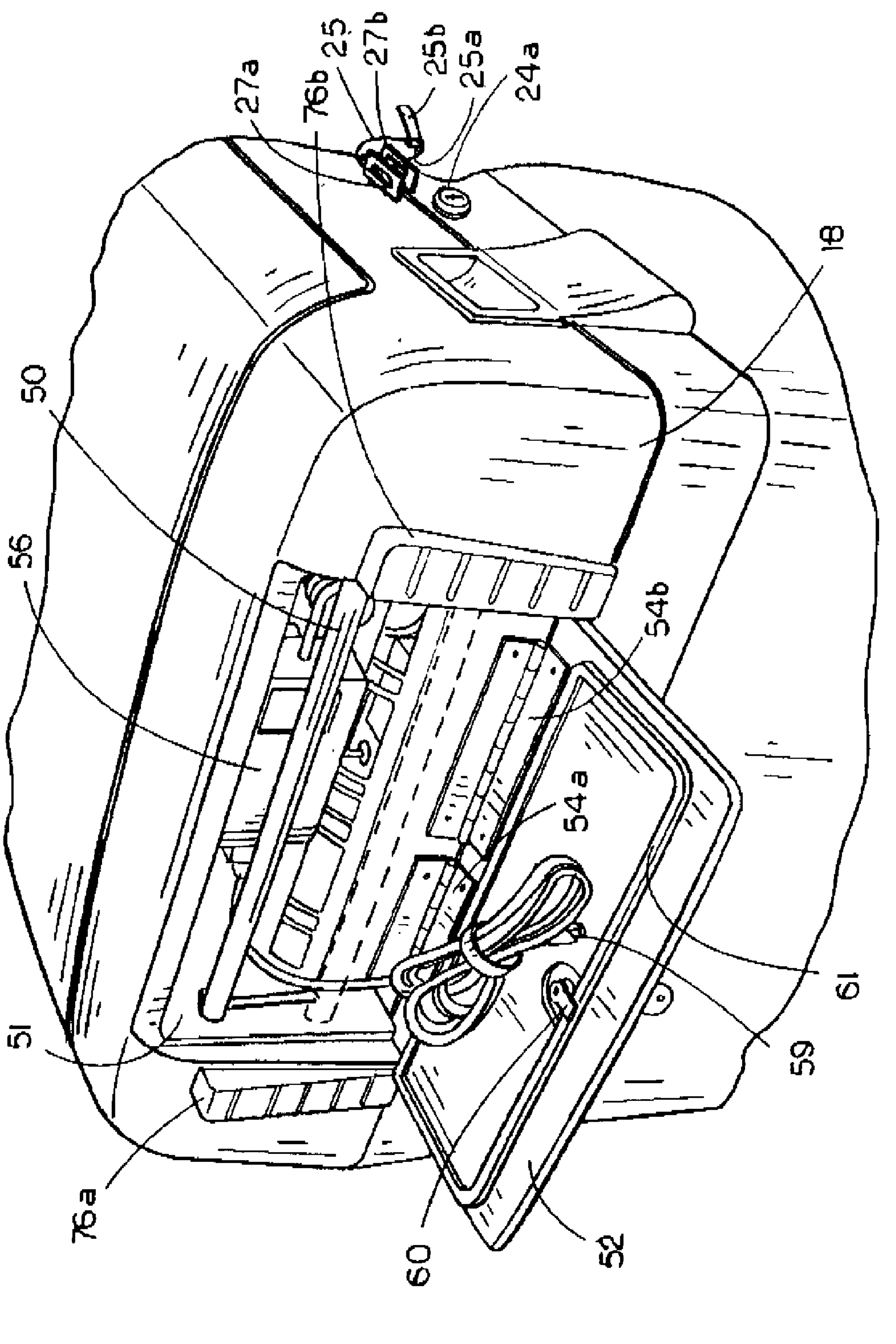
FIG. 4 is a perspective view of a rear portion of the ballot box of FIG. 1 showing a rear compartment on the case.

As also seen in FIG. 11, a ballot door 51 positioned in the ballot path of base 18 is moveable between a closed position (blocking the ballot path within base 18) and an open position (allowing ballots to pass through the ballot path). Lever 50, shown in FIG. 4 positioned within a rear compartment 51 of the base, is linked to the ballot door to allow an operator to move the ballot path door 51 between its closed and open positions to thus allow an operator to selectively allow or disallow use of the ballot path. As seen in FIG. 4, lever 50 can be moved between its closed position (lever 50 in the upper position) and its open position (lever 50 in the lower position, shown in phantom lines), to move the ballot door within the ballot path of base 18 to either a closed or open position, respectively so that passage of ballots through the ballot path is either prohibited or allowed.

Figure 10:
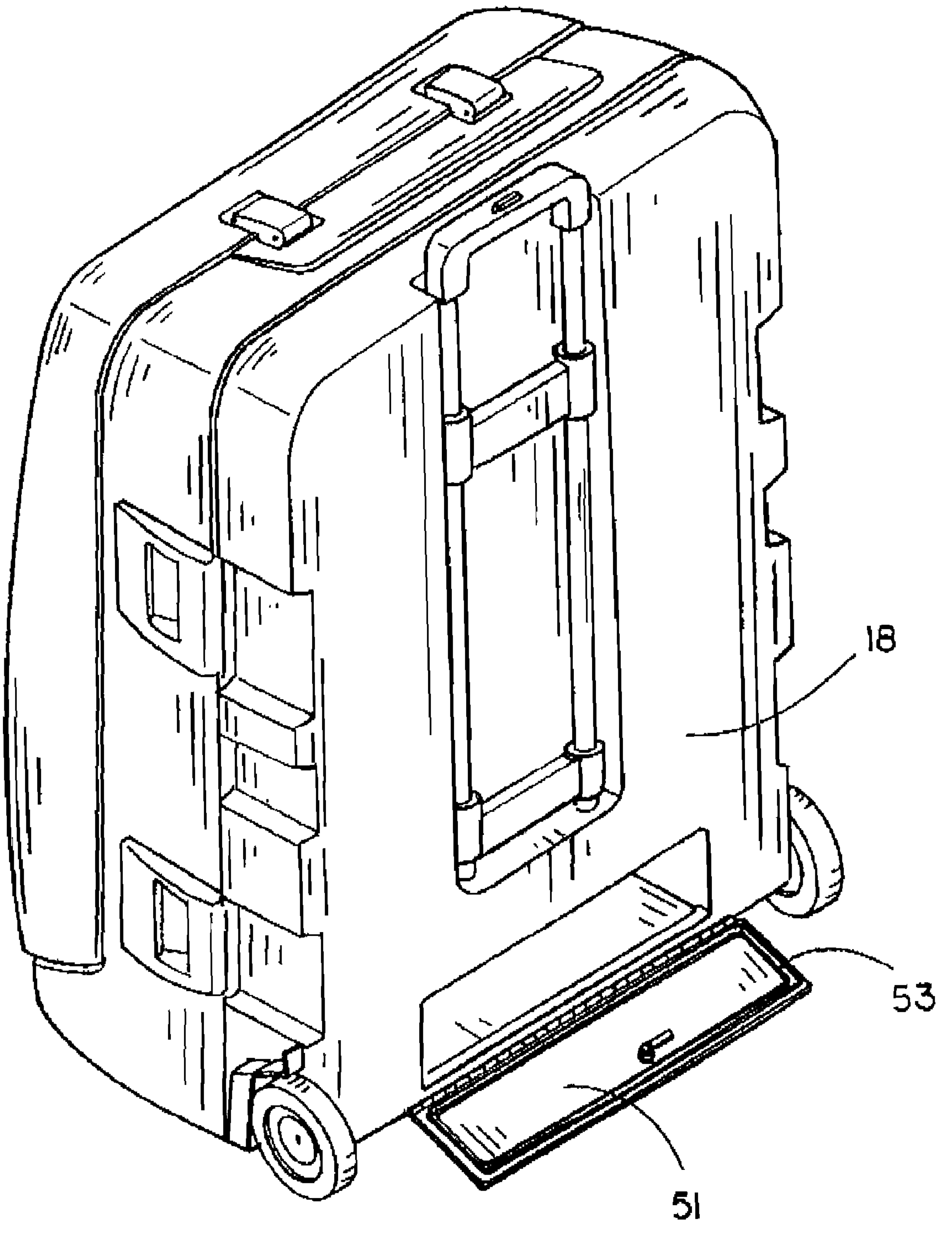
FIG. 10 is a rear perspective view of the case of FIG. 5.

As best shown in FIG. 10, ballot path door 51 includes a compressible, resilient seal 53 around the perimeter of its innermost surface so that with door 51 closed against base 18, the ballot path is environmentally sealed to prohibit entry of any rain, moisture, dust, or other environmental contaminants. In conjunction with the other seals on base 18 as described herein, base 18 is thus sealed against any environmental contamination.

Referring again to FIG. 4, a rear door 52 is joined to base 18 via hinges 54*a* and 54*b* so that rear door 52 is moveable between a closed position, enclosing rear compartment 51, and an open position allowing access to the rear compartment. A power supply 56 for the scanner is mounted within the rear compartment for supplying power to scanner. As seen in FIG. 2, a plug 58 is joined to the power supply via a power cord that extends from the converter to the interior of the base through an opening in the rear compartment. Plug 58 is configured to be received by the scanner for supplying power from the power supply 56 to the scanner. A second plug 59, as shown in FIG. 4, configured to mate with a standard electrical wall outlet, provides electrical power to the power supply from standard AC supply mains. Rear door 52 includes a lock 60 operable to secure the door in its closed position. A seal 61 extends around the perimeter of rear door 52 to environmentally seal rear compartment 51 when rear door 52 is in the closed position. Seal 61 is preferably resilient and compressible to prevent water and debris from entering rear compartment 51. In conjunction with seal 21 around cover 20 as described previously, the entire case is environmentally sealed, protecting the scanner enclosed therein.

Figure 7:
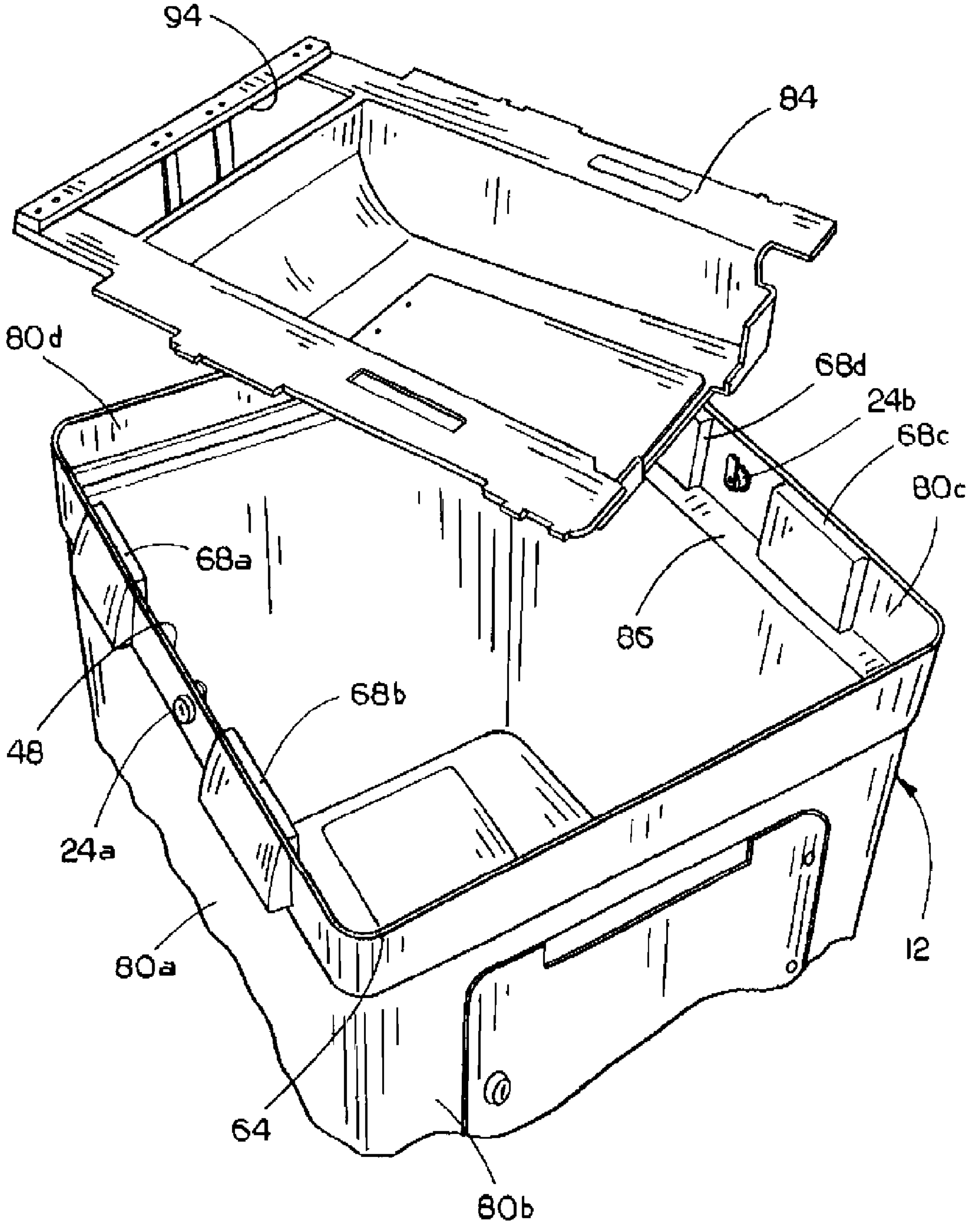
FIG. 7 is a perspective view of a portion of the ballot box of FIG. 1 showing an emergency ballot bin removed from the bin.

As seen in FIG. 7, and as will become apparent in conjunction with the description of main compartment 12 hereinbelow, base 18 includes a lip 62 extending around a perimeter of base 18, the lip configured to engage a top surface 64 of main compartment 12 when the case is supported by the compartment. Base 18 further includes slots 66*a* and 66*b*, as shown in FIG. 5, to receive tabs 68*a* and 68*b* protruding from the edge of main compartment 12 (shown in FIG. 7), for aligning the base with the top of the main compartment. Additional slots and protruding tabs 68*c* 68*d* on the opposite sides of the base and main compartment provide additional elements for aligning the base with the compartment so that the base can be supported on main compartment 12.

As shown in FIG. 5, case 14 is removable from main compartment 12 to allow case 14 (and thus the enclosed scanner) to be easily transported. Two wheels 70*a* and 70*h* mounted on opposite corners of the bottom of base 18, and a telescoping handle 72 mounted to a recess in base 18, allow easy transport of the base and scanner. Handles 74*a* and 74*b* attached to the side of the base allow the base to be lifted and maneuvered into position on top of compartment 12, with additional handles provided on the opposite side of base 18 for the same purpose. As shown in FIG. 4, two rubber pads 76*a* and 76*b* are joined to the rear of base 18 to provide a stable footprint when the base is in the position shown in FIG. 5. Additional rubber pads may be provided at various locations on the base to absorb impact and to protect the case 14 and scanner 16 during transport.

Main Compartment

Referring now to FIGS. 6-8, main compartment 12 comprises a generally square bottom 78, with the lower ends of side walls 80*a*, 80*b*, 80*c* and 80*d* joined to each side, respectively, of bottom 78. Top surface 64 is joined to the upper end of each of the side walls so that bottom 78, top surface 64, and side walls 80*a*, 80*b*, 80*c*, 80*d* from main compartment 12, with an interior cavity defined therein. A main ballot bin 82 is positioned within the interior of compartment 12, supported on bottom 78, with an emergency ballot bin 84 supported within the interior by a ledge 86 extending inwardly from sidewalls 80*a*, 80*c*, 80*d*.

First and second side doors 88 and 90 are attached via hinges to side wall 80*b* so that each side door is moveable between a closed position (enclosing the compartment's interior) and an open position allowing access to a portion of the interior. Each side door includes a lock 91*a*, 91*b* for securing the respective door to prevent access to the interior of compartment 12. The locks operate in substantially the same manner as lock 24*a* described above, but it is within the scope of the present invention for the locks to be any type of lock or locking mechanism known in the art.

As shown in FIG. 6, main ballot bin 82 is exposed when first side door 88 is in the open position, and emergency ballot bin 84 is exposed when second side door 90 is in the open position. As best seen in FIG. 8, a slot 92 in second side door 90 allows for depositing ballots into emergency ballot bin 84 when the second side door is in the closed position. As shown in FIG. 7, a slot 94 at the top rear area of emergency ballot bin 84 is aligned with exit of the ballot path of base 18 sot that ballots exiting the ballot path of base 18 pass through slot 94 to reach main ballot bin 82 at the bottom of compartment 12.

As seen in FIG. 8, a top cover 96 is also supported by ledge 86, atop and enclosing the emergency ballot bin, and is locked to side walls 80*a* and 80*c* with locks 24*a* and 24*b*. While top cover 96 is shown, it is not required, and it is within the scope of the present invention for top 96 to be excluded, with no top covering the interior of the bin when the case is removed from the top of the bin. As is apparent, when top cover 96 is present, it supports case 14 when the case is placed in position atop main compartment 12, and when top cover 96 is not present, case 14 is supported by ledge 86 in addition to support provided by top surface 64. Handles 98*a*, 98*b* formed into side wall 80*a* allow easy lifting and maneuvering of main compartment 12, with two additional handles preferably formed into side wall 80*c* for the same purpose.

Main ballot bin 82 includes a bottom 100 joined with side walls 102*a*, 102*b*, 102*c* and 102*d* to define an interior storage area, with a lid 99 joined to side wall 102*d* by hinges 104*a* and 104*b* so that lid 99 is moveable between an open position, as shown in FIG. 6, and a closed position. Lid 99 is moved to the open position when the main ballot bin 82 is inserted into the bottom of bin 12 so that ballots can be received within the interior of the main ballot bin 82, and is moved to the closed position when the main ballot bin 82 is being transported with the ballots secured inside. Preferably, lid 99 may be secured or locked to side wall 102*b* for securing the contents of bin 82 during transport. Main ballot bin 82 is removable from main compartment 12 for transporting the ballots to a central location after an election. While the exemplary embodiment depicted includes main ballot bin 82, it is within the scope of the invention that no separate ballot bin be included, with the ballots accumulating in main compartment 12.

Scanner

Referring now to FIGS. 1 and 3, scanner 16 preferably includes a screen 106 for displaying information to a user, such as candidate choices, voter selections, and confirmation messages to inform a voter that his/her ballot has been successfully scanned and deposited within main compartment 12. The screen is preferably a liquid crystal display "touch screen" having the capability to receive user inputs. Screen 106 is moveable between a closed position as shown in FIG. 3, and an open position as shown in FIG. 1. A lock 108 is operable to lock screen 106 in the closed position. Preferably, scanner 16 includes a microprocessor electronically coupled with a memory storage device containing information to display on screen 106. The scanner 16 preferably has the capability to optically scan ballots and store the results on the memory storage device as an electronic image, most preferably in bitmap format. The memory storage device containing the information to display on screen 106 and the memory storage device for storing results of the optical scanner are preferably solid state memory devices, but it is within the scope of the invention for the memory storage devices to be any type of memory storage device such as hard drives, zip drives, or optical storage devices. Each memory storage device preferably may be inserted into a compartment within the scanner that has a locking lid to secure the compartment and prevent unauthorized removal of the respective memory storage device. Preferably, the scanner also includes a printer for printing an audit or event log of ballots scanned by the scanner. The scanner may also be connected to a network for transmitting the scanned results to a central computer. Preferably, scanner 16 is a model of scanner sold under the trade name "intElect DS200" by Election Systems & Software, Inc. headquartered in Omaha, Nebr.

Looking to FIG. 6, tabs 27*a* and 27*b* extend from the sides of case 18 and the upper portion of main compartment 12, respectively, such that the tabs are positioned adjacent one another and the openings in the tabs are aligned. A tamper resistant seal 25, comprising a wire 25*a* and identification tag 25*b*, is threaded through the openings of the tabs 27*a*, 27*b*, with the ends of wire 25*a* sealed within identification tag 25*b*. Tamper resistant seal 25 thus prevents case 18 from being removed from main compartment 12 without breaking or damaging wire 25*a*, identification tag 25*b*, or both. Thus, the tamper resistant seal provides an indication of any tampering or other unauthorized access to the main compartment, alerting to potential compromise of ballots stored in main compartment 12. Of course, other types of seals or tamper indicators may be used, and are within the scope of the present invention. Similar tab/seal arrangements are preferably included on all adjacent, removable portions of the ballot box to provide security and an indication as to whether any portions of the ballot box have been taken apart or otherwise potentially compromised.

Referring now to FIG. 11, sensor 19 is positioned within the ballot path of base 18 so that the sensor points downwardly into main compartment 12. Sensor 19 is in electrical communication with scanner 16, and is operable to detect any impediment within a predetermined distance from the sensor, and to send a signal to scanner 16 when any impediment is within that predetermined threshold level. Sensor 19 is thus operable to detect the height of ballots within main compartment 12, and to detect when the ballot path through base 18 is otherwise blocked (such as when the ballot door within the ballot path is closed). Upon detecting such a signal generated by sensor 19, scanner 16 switches from its "on" mode (in which the scanner accepts and scans ballots), to its "off mode" (in which the scanner will not accept ballots). Thus, sensor 19 signals the scanner to its "off" mode when either the height of ballots within main compartment 12 exceeds a predetermined level, or when the ballot door within the ballot path of base 18 has been closed (using handle 50, as described above). Preferably, scanner 16 displays a warning message when it receives the signal from sensor 19 to inform the user that the scanner will not accept any more ballots. Preferably, sensor 19 is a proximity sensor using infrared, acoustic, or capacitive technology to detect the ballots or door. Most preferably, the predetermined threshold level at which the sensor sends a signal is adjustable.

Operation

In operation, ballot box 10 is prepared for receiving ballots as follows. First, as seen in FIG. 8, top 96 (if present) is unlocked from side walls 80*a* and 80*c* of main compartment 12 and set aside. Case 14 is placed on top the main compartment, and is secured in place with locks 24*a* and 24*b*. Cover 20 is opened, exposing the interior of case 14, as shown in FIG. 1. Preferably, scanner 16 is already locked inside of the case as previously described, if not, however, the scanner may be installed within the case at this time by unlocking and opening retaining door 30 and sliding the rails on the bottom of the scanner into engagement with rails 28*a* and 28*b*, as shown in FIG. 2 and described previously. Retaining door 30 is then moved to its closed position and secured with lock 34, as shown in FIG. 3, to secure the scanner within the base 18. With the scanner thus secured, lock 108, as shown in FIG. 1, is unlocked to allow screen 106 to be moved to its open position.

Looking to FIG. 4, lock 60 is unlocked and door 52 is moved to its open position. Plug 58, shown in FIG. 2, is connected to the scanner and plug 59 is inserted into a wall outlet to supply power to the scanner. Lever 50 is moved from the closed position to the open position, as depicted in phantom lines in FIG. 4, to allow ballots to pass through the ballot path in base 18. Doors 88 and 90, shown in FIG. 6, are unlocked and opened. Emergency ballot bin 84 is inserted into main compartment 12, resting on top of ledge 86. Door 99 on main ballot bin 82 is opened, and the main ballot bin is inserted into the bottom portion of main compartment 12. With the main ballot bin and emergency ballot bin thus placed, doors 88 and 90 are closed and locked to secure the main compartment 12. The ballot box is thus ready for receiving ballots.

A user/voter inserts a ballot into opening 44 on scanner 16, shown in FIG. 1. The ballot is pulled through the scanner via an internal drive mechanism, with an image of the ballot being scanned and recorded on a storage medium by the scanner before the ballot exits through the rear of the scanner. Upon exiting the scanner, the ballot passes through opening 46 in base 18 (shown in FIG. 2), from base 18 through opening 48 in the top of main compartment 12 (shown in FIG. 7), and into main compartment 12 where the ballot lands in main ballot bin 82 positioned at the bottom of the main compartment. Scanner 16 preferably displays a message indicating that the ballot was successfully accepted. If scanner 16 cannot read a ballot, then the scanner preferably returns the ballot to the user and displays a message to that effect to the user, and indicates that the ballot should be deposited through slot 92 in the upper portion of door 90 (as seen in FIG. 6) so that the ballot is received in the emergency ballot bin 84. Similarly, if sensor 19 detects that the level of ballots within main compartment 12 has exceeded a predetermined threshold level, then the sensor signals the scanner, to switch to its "off" mode such that the scanner will not accept any more ballots, thus preventing overfilling of main compartment 12 and preventing jamming of the scanner. In such a case, the scanner preferably displays a message indicating that main compartment 12 is full.

When there are no more ballots to be processed by the scanner 16, screen 106 of the scanner is closed and locked, and cover 20 is closed and locked with the scanner secured inside. Case 14 is unlocked and removed from the top of main compartment bin 12, the case and scanner may then be transported to a secure location using telescoping handle 72 and wheels 70*a* and 70*b*. Door 88 is unlocked and opened and main ballot bin 82 is removed, closed, and locked, and the ballots transported to a desired location for processing, recording, and/or storage. Likewise, door 90 is unlocked and opened so that the ballots in emergency ballot bin 84 may be collected and transported to a desired location for recording or storage. Doors 88 and 90 are then closed and locked and top 96 is locked to side walls 80*a* and 80*c* so that the main compartment may be securely stored.

Alternative Embodiments

FIGS. 9*a*, 9*b*, 9*c* and 9*d* depict alternative embodiments of a transport case or main ballot bin in accordance with the present invention.

Figure 9A:
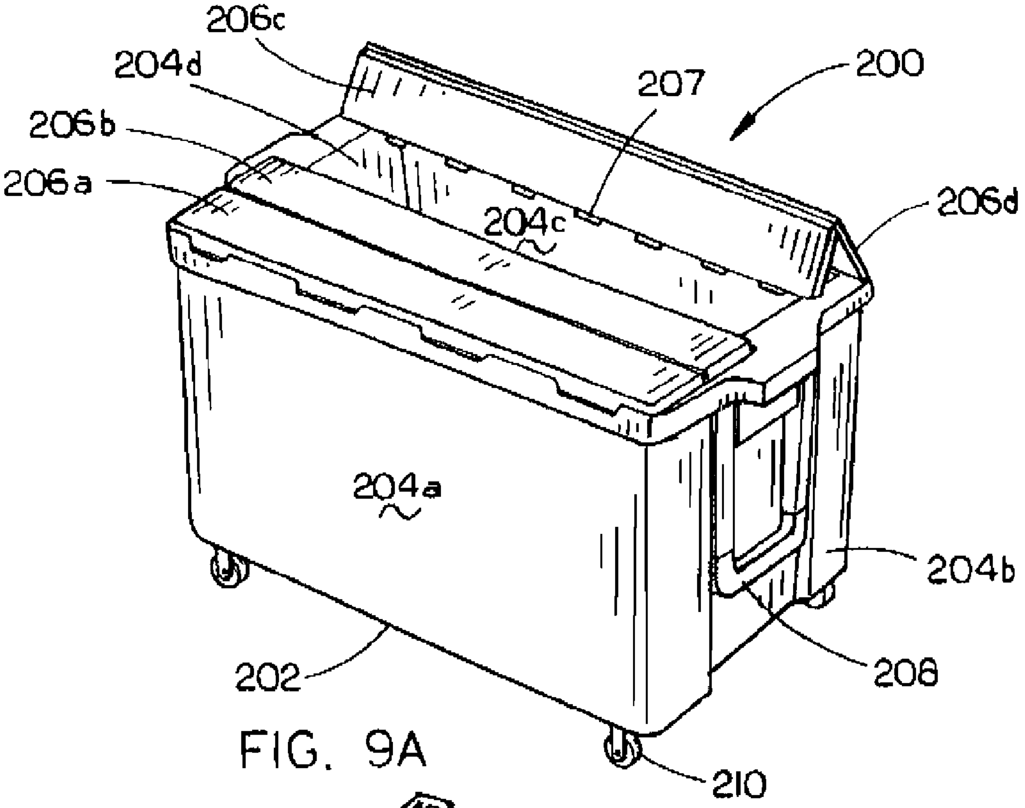
FIG. 9*a* is a perspective view of a second exemplary embodiment of the present invention having a main ballot bin that can be inserted into the bottom of the bin of the ballot box of FIG. 1.

Looking first to FIG. 9*a*, a second exemplary of a transport case 200 in accordance with a second exemplary embodiment of the present invention includes a bottom panel 202 joined with side walls 204*a*, 204*b*, 204*c* and 204*d*. The transport case further includes a top comprising two sets of hingedly joined panels, 206*a*, 206*b*, 206*c* and 206*d*. Outermost panels 206*a* and 206*d* are joined via hinges to side walls 204*a* and 204*c* respectively, with innermost panels 206*b*, 206*c* joined to panels 206*a* and 206*d*, respectively. Interlocking teeth 207 extending from panels 206*b* and 206*c* mateably join when the panels are pressed into their closed position. A telescoping handle 208 is joined with side wall 204*b*, and a caster wheel 210 is mounted at each of the four corners of bottom 202 for ease of movement.

Figure 9B:
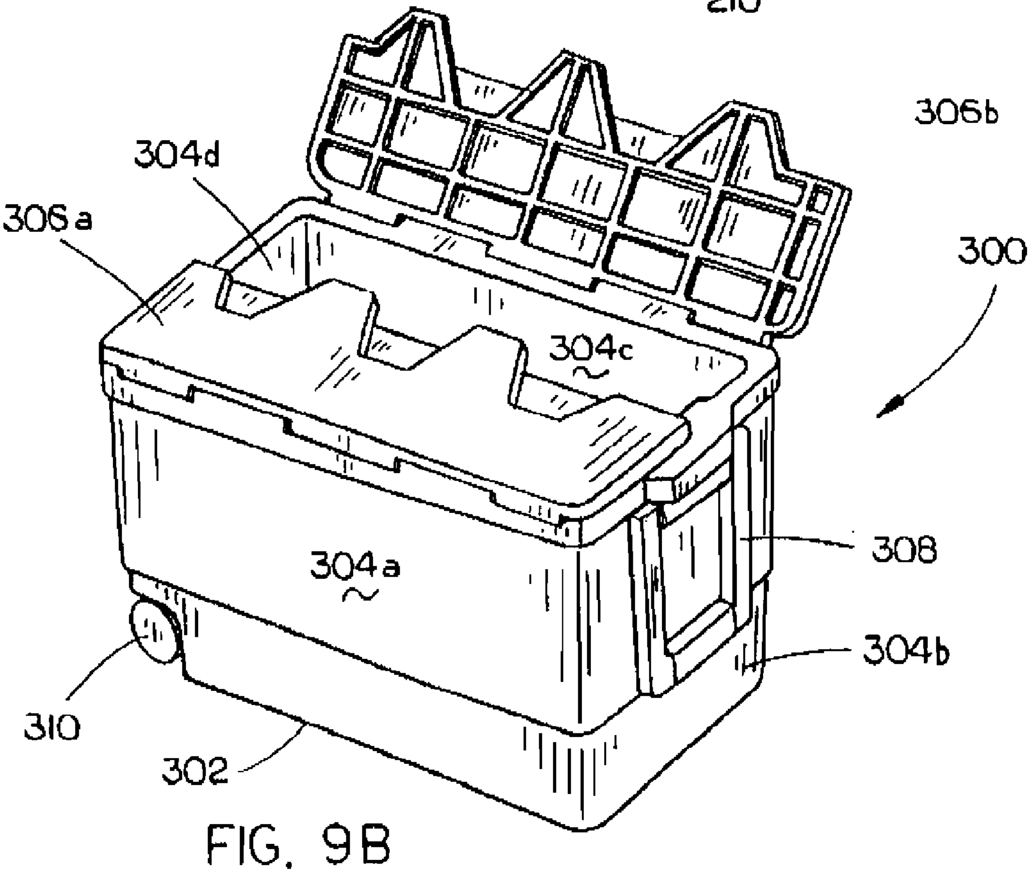
FIG. 9*b* is a perspective view of a third exemplary embodiment of the present inventions having a main ballot bin.

FIG. 9*b* depicts a shows an alternative transport case 300 having a bottom 302 joined with side walls 304*a*, 304*b*, 304*c* and 304*d*. The case includes a top with two panels 306*a* and 306*b* joined via hinges with side walls 304*a* and 304*c* respectively. Panels 306*a* and 306*b* includes interlocking tabs that overlap when the panels are closed to enclose the interior of the case. A handle 308 is joined with side wall 304*b* and a caster wheel 310 is mounted at each of two opposed corners of the bottom 302 for ease of movement.

Figure 9C:
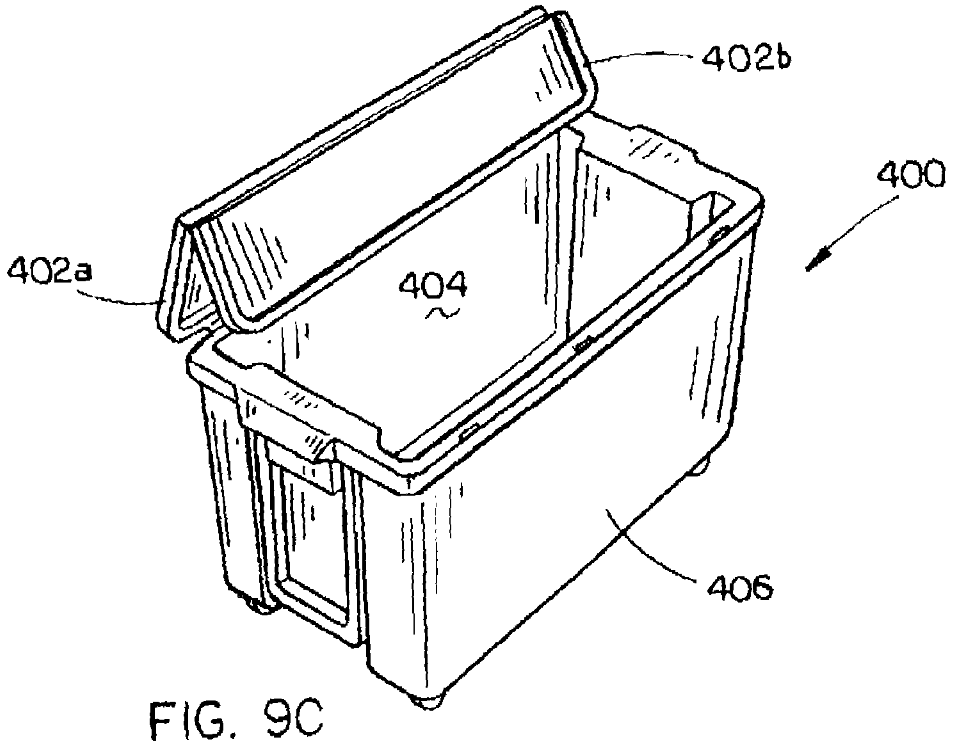
FIG. 9*c* is a perspective view of a fourth exemplary embodiment of the present invention having a main ballot bin.

FIG. 9*c* depicts shows an alternative transport case 400 which is substantially similar to transport case 200 shown in FIG. 9*a* except that the top comprises two panels 402*a* and 402*b* joined by a hinge, with panel 402*a* attached to side wall 404 with a hinge. When the top encloses the interior of the case, aligned slots on panel 402*b* and side wall 406 receive a wire tamper seal (not shown) that operates in substantially the same manner as described above to provide an indication that the case has been opened.

Figure 9D:
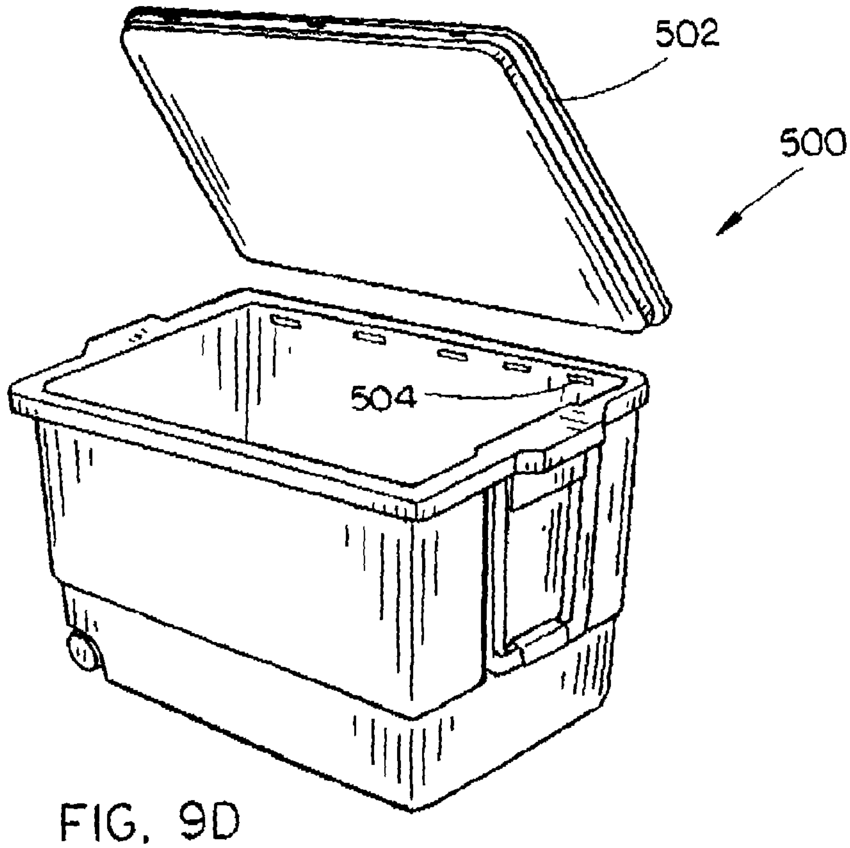
FIG. 9*d* is a perspective view of a fifth exemplary embodiment of the present invention having a main ballot bin.

FIG. 9*d* shows an alternative transport case 500 which is substantially similar to transport case 300 shown in FIG. 9*b* except that the top comprises a single removable panel 502. Panel 502 has a locking mechanism which preferably consists of protruding tabs that extend from panel 502 into slots 504 to lock the panel to the side walls of the case. When the panel is locked to the side walls, there are preferably aligned slots in the panel and side walls of the case for receiving a wire tamper seal in a manner similar to that described previously with respect to the base and main compartment.

From the foregoing it will be seen that this invention is one well adapted to attain all ends and objectives herein-above set forth, together with the other advantages which are obvious and which are inherent to the invention. For example, the ballot box described herein is adapted to safely and securely transport a scanner between a central location and a polling site. The upper case described above has the capability to completely enclose the scanner for safely and securely transporting the scanner.

Since many possible embodiments may be made of the invention without departing from the scope thereof it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A ballot box comprising:

a main compartment configured to receive ballots;

a case positioned on and supported by said main compartment, said case comprising a base and a cover, said cover movably attached to said base;

a scanner, said scanner removably positioned on said base such that said cover is moveable between a closed position wherein said scanner is completely enclosed within said case and an open position wherein at least a portion of said scanner is exposed, wherein said case and said scanner are removable from said main compartment; and a sensor positioned within said main compartment, said sensor operable to detect a height of ballots within said main compartment and further operable to detect a ballot door in a closed position in said main compartment, said sensor in electrical communication with said scanner and operable to signal said scanner when said height equals or exceeds a predetermined threshold or when said ballot door is in a closed position such that said scanner switches from an on mode to an off mode.

2. The ballot box of claim 1, wherein said scanner is operable in a first mode wherein said scanner accepts and scans ballots and passes said ballots to said main compartment, and is operable in a second mode wherein said scanner will not accept and scan said ballots; and wherein said scanner can be switched between said first and second modes.

3. The ballot box of claim 2, further comprising a sensor in electrical communication with said scanner, said sensor operable to detect a height of ballots accumulated in said main compartment and to provide a signal to said scanner when said height reaches a predetermined threshold such that said scanner is switched to said second mode to not accept subsequent ballots.

4. The ballot box of claim 1, further comprising a first rail attached to said base and a second rail attached to said scanner, said first and second rails configured to mate together to mount said scanner to said base.

5. The ballot box of claim 4, further comprising a retaining door movably coupled to said base, said door moveable between an open position wherein access to said rails is permitted such that said scanner may be attached to or removed from said base, and a closed position wherein access to said rails is prohibited such that said scanner may be secured to said base.

6. The ballot box of claim 5, further comprising:

a first lock operable to secure said base to said main compartment;

a second lock operable to secure said cover to said base; and a third lock operable to secure said retaining door to said base.

7. The ballot box of claim 6, further comprising at least one tamper resistant seal attached to at least one of said first, second, and third locks.

8. The ballot box of claim 1, further comprising a ballot path, wherein said scanner comprises a first portion of the ballot path configured to direct ballots towards said base, wherein said base comprises a second portion of the ballot path configured to direct ballots toward said main compartment, and wherein said main compartment comprises a top surface configured to support said base, said top surface comprising an opening generally aligned with said second ballot path such that ballots exiting said second portion of the ballot path pass into said main compartment.

9. The ballot box of claim 8, wherein said main compartment further comprises side walls coupled to said top surface and a bottom wall coupled to said side walls to define an interior cavity, said interior cavity configured to receive at least one of an emergency ballot bin and a main ballot bin.

10. The ballot box of claim 9, further comprising an emergency ballot bin and a main ballot bin positioned within said interior cavity, wherein at least one of said side walls comprises a slot aligned with said emergency ballot bin such that ballots deposited in said slot fall into said emergency ballot bin; and wherein said opening in said top surface of said main compartment is aligned with said main ballot bin such that ballots entering said opening fall into said main ballot bin.

11. The ballot box of claim 10, wherein one of said side walls comprises a first side door moveable between a closed position enclosing said interior cavity and an open position exposing at least a portion of said interior cavity, said first side door allowing access to said main ballot bin.

12. The ballot box of claim 11, wherein one of said side walls comprises a second side door moveable between a closed position enclosing said interior cavity and an open position exposing at least a portion of said interior cavity, said second side door allowing access to said emergency ballot bin.

13. The ballot box of claim 8, further comprising:

a ballot door positioned within said second portion of the ballot path, said ballot door moveable between a closed position blocking said second portion of the ballot path and an open position allowing ballots to travel through said second portion of the ballot path; and a lever coupled with said ballot door operable to move said ballot door between said open and closed positions.

14. The ballot box of claim 1, wherein said main compartment comprises a bottom coupled with side walls to define an interior cavity, and wherein said main compartment further comprises a top removably coupled with said side walls and configured to lock to said side walls.

15. The ballot box of claim 1, further comprising a power supply for supplying power to said scanner.

16. The ballot box of claim 1, wherein said case further comprises:

at least one wheel and a handle attached to said base for transporting said case.

17. The ballot box of claim 1, further comprising a damper coupled between said base and said cover to maintain said cover in its open position.

18. The ballot box of claim 1, further comprising a main ballot bin configured to fit within said main compartment, said main ballot bin comprising bottom, top and side walls attached to define an interior area, wherein said top is moveable between an open position for accepting ballots into said interior area and a closed position for enclosing said interior area, and wherein said top is configured to mate with and lock to said side walls to secure said interior area.

19. The ballot box of claim 18, wherein said main ballot bin is removable from said main compartment, and wherein said main ballot bin comprises wheels and a handle coupled thereto to allow transport of said main ballot bin.

20. A ballot box comprising:

a bin for collecting ballots;

a scanner coupled to said bin and operable to switch between an on mode in which said scanner accepts and scans ballots and deposits the ballots in said bin, and an off mode in which said scanner does not accept and scan ballots;

a case positioned upon and supported by said bin, wherein said case further supports said scanner;

a ballot path, wherein said scanner comprises a first portion of the ballot path and said case comprises a second portion of the ballot path, wherein said bin comprises a top surface configured to support said case, said top surface comprising an opening, and wherein said first portion of the ballot path is positioned adjacent said second portion of the ballot path and said second portion of the ballot path is positioned adjacent said opening such that ballots pass from said scanner through said first portion of the ballot path, through said second portion of the ballot path, and through said opening into said bin; and a ballot door positioned within said second portion of the ballot path and moveable between a closed position blocking said second portion of the ballot path and an open position allowing ballots to travel through said second portion of the ballot path; and a sensor operable to detect a height of ballots within said bin and further operable to detect a ballot door in a closed position in said bin, said sensor in electrical communication with said scanner and operable to signal said scanner when said height equals or exceeds a predetermined threshold or when said ballot door is in a closed position such that said scanner switches from said on mode to said off mode.

21. The ballot box of claim 20, wherein said sensor is attached to said case.

* * * * *